United States Patent [19]
Lund et al.

[11] Patent Number: 6,027,156
[45] Date of Patent: Feb. 22, 2000

[54] VEHICLE SHIELD DEVICE

[75] Inventors: James R. Lund, Champlin; Alan B. Eke, Blaine, both of Minn.

[73] Assignee: Lund Industries, Incorporated, Anoka, Minn.

[21] Appl. No.: 08/965,587

[22] Filed: Nov. 6, 1997

Related U.S. Application Data

[63] Continuation of application No. 08/229,398, Apr. 18, 1994, Pat. No. 5,755,483, which is a continuation of application No. 07/982,249, Nov. 25, 1992, abandoned, which is a continuation of application No. 07/777,758, Oct. 15, 1991, abandoned, which is a division of application No. 07/556,491, Jul. 26, 1990, Pat. No. 5,112,095.

[51] Int. Cl.$^7$ ........................................................ B60J 1/20
[52] U.S. Cl. ................................................................ 296/91
[58] Field of Search ................................................ 296/91

[56] References Cited

U.S. PATENT DOCUMENTS

| | | |
|---|---|---|
| D. 167,676 | 9/1952 | Chicorel . |
| D. 201,496 | 6/1965 | Stef . |
| D. 272,429 | 1/1984 | Trombley et al. ................... D12/190 |
| D. 283,120 | 3/1986 | Trombley et al. ................... D12/190 |
| D. 284,565 | 7/1986 | Trombley et al. ................... D12/190 |
| D. 300,918 | 5/1989 | Turner ................................. D12/190 |
| 2,034,493 | 3/1936 | Sonnenberg ..................... 296/136 X |
| 2,236,846 | 4/1941 | Davisson ............................. 296/91 |
| 2,757,954 | 8/1956 | Hurley ................................. 296/91 |
| 2,792,254 | 5/1957 | Hagglund ............................ 296/91 |
| 2,793,705 | 5/1957 | Garrity . |
| 3,015,517 | 1/1962 | Thornburgh ........................ 296/91 |
| 3,022,848 | 2/1962 | Heiser . |
| 3,695,674 | 10/1972 | Baker .............................. 296/91 X |
| 3,815,700 | 6/1974 | Mittendorf ...................... 296/91 X |
| 4,040,656 | 8/1977 | Clenet ................................. 296/91 |
| 4,043,587 | 8/1977 | Giallourakis et al. ............... 296/91 |
| 4,052,099 | 10/1977 | Lowery et al. ...................... 296/91 |
| 4,063,773 | 12/1977 | Modesette .......................... 296/91 |
| 4,153,129 | 5/1979 | Redmond ....................... 296/91 X |
| 4,159,845 | 7/1979 | Bratsberg ....................... 296/91 X |
| 4,219,218 | 8/1980 | Waldon ......................... 296/136 X |
| 4,262,954 | 4/1981 | Thompson .......................... 296/91 |
| 4,376,546 | 3/1983 | Guccione et al. ............. 296/136 X |
| 4,471,991 | 9/1984 | Matthias ............................. 296/91 |
| 4,621,860 | 11/1986 | Gerst .................................. 296/91 |
| 4,627,657 | 12/1986 | Daniels et al. ..................... 296/91 |
| 4,842,319 | 6/1989 | Ziegler ................................ 296/91 |
| 4,883,139 | 11/1989 | Gross ............................... 180/68.6 |
| 4,929,013 | 5/1990 | Eke .................................... 296/91 |
| 4,952,006 | 8/1990 | Willey ................................ 296/91 |
| 4,953,909 | 9/1990 | Crane ................................ 296/136 |

FOREIGN PATENT DOCUMENTS

| | | | |
|---|---|---|---|
| 1096819 | 6/1955 | France ................................ 296/91 |
| 1121035 | 7/1956 | France ................................ 296/91 |
| 734743 | 8/1955 | United Kingdom ................. 296/91 |
| 1375886 | 11/1974 | United Kingdom ............... 280/770 |

OTHER PUBLICATIONS

Photographs of GT Styling Bug Gard product for Jeep Cherokee.
Photographs of GT Styling Bug Gard product for Range Rover.
J.C. Whitney & Co., Catalog 506J, May 1989, pp. 88–91.

*Primary Examiner*—Dennis H. Pedder
*Attorney, Agent, or Firm*—Merchant & Gould P.C.

[57] ABSTRACT

A vehicle shield device is provided for mounting on a front of a vehicle. The vehicle shield device has a hood protector portion and a fender protector portion for protecting portions of the hood and the fender from contact with airflow. The vehicle shield further includes an airflow deflector portion extending from a back edge of the hood protector portion for deflecting airflow away from a windshield of the vehicle. The hood protector portion, the fender protector portions, and the airflow deflector portion cooperate to form a continuous airflow engaging surface extending across a portion of the front of a vehicle.

2 Claims, 8 Drawing Sheets

VEHICLE SHIELD DEVICE

This application is a Continuation of application Ser. No. 08/229,398, filed Apr. 18, 1994, and which issued as U.S. Pat. No. 5,755,483, on May 26, 1998. Application Ser. No. 08/229,398 is a Continuation of application Ser. No. 07/982,249, filed Nov. 25, 1992, and which is abandoned. Application Ser. No. 07/982,249 is a Continuation of application Ser. No. 07/777,758, filed Oct. 15, 1991, and which is now abandoned. Application Ser. No. 07/777,758 is a divisional of application Ser. No. 07/556,491, filed Jul. 26, 1990, and which issued as U.S. Pat. No. 5,112,095 on May 12, 1992. These applications are incorporated herein by reference.

FIELD OF THE INVENTION

This invention relates to a vehicle shield device for use in protecting a front portion of a vehicle from contact with airflow and for use in deflecting airflow from a windshield portion of the vehicle during operation of the vehicle.

BACKGROUND OF THE INVENTION

Motor vehicles such as trucks and automobiles are exposed to airflow during operation. One significant problem that arises is caused by contact between the vehicle and the airflow which often contains rocks, dust, rain, snow, insects, and other road debris. If the debris contacts the front of the vehicle, the impact may cause damage to the vehicle. Insects and other debris may also accumulate on the front of the vehicle. If the debris contacts the windshield of the vehicle, the windshield may be damaged and an accumulation of debris on the windshield may obstruct visibility.

To address these problems, vehicle shield devices have been placed on the fronts of vehicles in an attempt to protect the fronts of the vehicles from contact with the road debris and to deflect the airflow away from the windshields. However, many of the conventional vehicle shield devices have a variety of different problems which make the conventional devices undesirable.

One problem that arises with some conventional vehicle shield devices is that the devices just protect a portion of the hood and do not protect any of the fender of the vehicle. Some portions of the fender are exposed to direct contact with the airflow. Just as road debris can damage and accumulate on the hood, portions of the fender can also be damaged by contact with the debris and are subject to accumulation of debris.

Another problem relates to vehicle shield devices which combine a hood protector portion with an airflow deflector portion. Such conventional structures disclose airflow deflector portions positioned at or very near the front of the vehicle. In this position, the deflector portion is located a substantial distance from the windshield and may produce excessive drag and may not efficiently deflect the airflow away from the windshield.

Another problem relates to adjustable airflow deflectors. Adjustable deflectors have encountered problems related to the hinging of the deflectors with respect to a vehicle surface having a nonplanar shape. If a nonplanar shape exists, it is difficult to provide a vehicle shield device that is movable such that it follows the contours of the vehicle in all positions while presenting a continuous airflow engaging surface across the front of the vehicle. Some shield devices having a single-piece deflector structure are movable but they are generally planar and do not follow the contours of the front of the vehicles in all positions. U.S. Pat. No. 4,929,013 discloses a vehicle shield device having a multi-piece deflector structure which presents a continuous airflow engaging surface across the front of the vehicle but it requires specially-designed hinges to attach the device to the vehicle. Two side hinges are designed to permit both rotational and longitudinal movement of portions of the device during movement of the device and a central hinge is required which both pivotally attaches to the hood and pivotally attaches to the deflector structure.

It is clear that there has been a continuing need for improvements in vehicle shield devices to provide for protection of the fronts of the vehicles and to provide for deflection of airflow away from the windshields of the vehicles while addressing the above-recited problems or similar problems that exist with conventional vehicle shield devices.

SUMMARY OF THE INVENTION

One embodiment of the present invention relates to an airflow deflector apparatus which is adapted to be mounted on the hood of a vehicle and is operable between a first, open position, for deflecting airflow and a second, closed position, in substantial conformity with the hood of the vehicle. The airflow deflector has a first lateral wing member and a second lateral wing member. The airflow deflector apparatus further has first lateral hinge structure defining a first hinge axis for coupling the first lateral wing member to the hood. The first lateral hinge structure permits rotational movement of the first lateral wing member between the open position and the closed position relative to the first hinge axis while restraining longitudinal movement. The airflow deflector apparatus further has second lateral hinge structure defining a second hinge axis for coupling the second lateral wing member to the hood. The second lateral hinge structure permits rotational movement of the second wing member between the open position and the closed position relative to the second hinge axis while restraining longitudinal movement. The airflow deflector apparatus further includes central hinge structure defining a center hinge axis for connecting a central wing section structure to the hood. The central hinge structure permits rotational movement of the central wing section structure between the open position and the closed position relative to the center hinge axis while restraining longitudinal movement. The central wing section structure retains adjacent ends of the first and second lateral wing members. The central wing section structure also permits relative movement between the lateral wing members and the central wing section structure during movement of the lateral wing members and the central wing section structure between the open position and the closed position.

Another embodiment of the present invention relates to an airflow protector device which is mountable to a front of a vehicle having a hood and a fender and includes a hood protector portion and a fender protector portion. The hood protector portion and the fender protector portion cooperate to present a continuous airflow engaging surface extending across a portion of the front of the vehicle which protects a portion of the hood and a portion of the fender of the vehicle from contact with airflow.

A further embodiment of the present invention relates to a vehicle shield device which is mountable to a hood of a vehicle. The vehicle shield device includes a hood protector portion with a first protector portion adapted to surround a generally vertical front surface of the hood. The hood protector portion further has a second protector portion adapted to surround a generally horizontal top surface of the hood. The first protector portion and the second protector portion present a continuous airflow engaging surface to protect the front surface and the top surface of the hood from contact with airflow. The vehicle shield device further includes an airflow deflector portion extending from a back edge of the second protector portion and diverging away from the surface of the hood.

Another embodiment of the present invention relates to an airflow deflector apparatus adapted to be mounted on a hood of a vehicle. The airflow deflector apparatus has a lateral wing member for deflecting airflow. Hinge structure, coupled to the wing member, is provided to permit the wing member to be rotated between an open position for deflecting airflow, and a closed position in substantial conformity with the hood. The airflow deflector apparatus has lock structure coupled to the wing member for securing a first portion of the wing member in a fixed rotated position. Torsion spring structure, coupled to the wing member, is provided to bias a second portion of the wing member against rotation relative to the first portion.

BRIEF DESCRIPTION OF THE DRAWINGS

In the drawings wherein like reference numerals generally indicate corresponding parts throughout the several views.

DETAILED DESCRIPTION OF THE PREFERRED EMBODIMENTS

Figure 1:
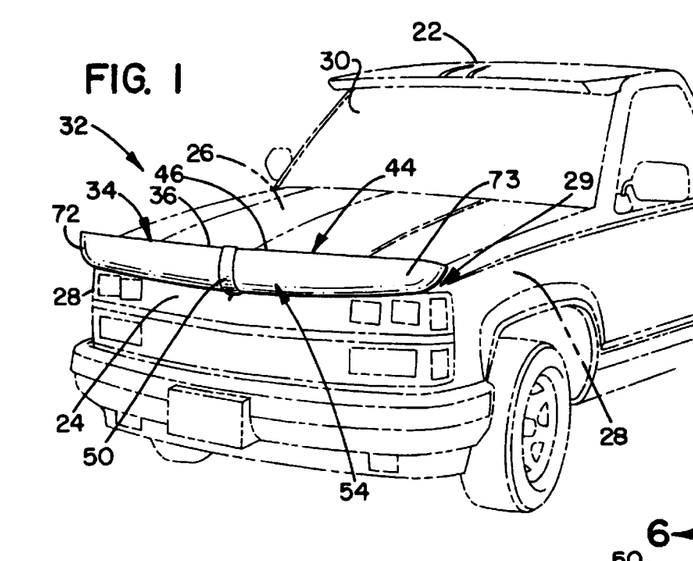
FIG. 1 is a perspective view of a first preferred embodiment of a vehicle shield device mounted to a vehicle showing the vehicle shield device in the first or open position.
Figure 2:
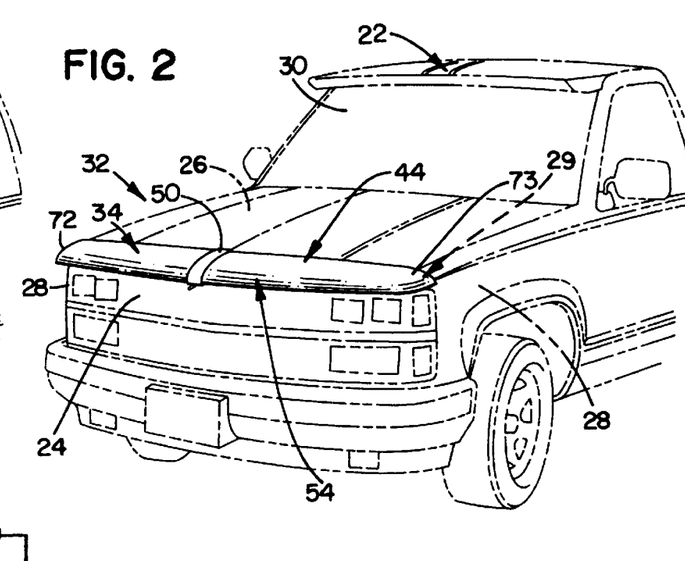
FIG. 2 is a perspective view of the vehicle shield device shown in FIG. 1 showing the device in the second or closed position.

FIGS. 1–9 illustrate a first preferred embodiment of a vehicle shield device or vehicle shield 32 according to the principles of the present invention. Referring now to FIGS. 1 and 2, the vehicle shield 32 is shown positioned on a front 24 of a vehicle 22. The vehicle 22 shown has a hood 26, two front fenders 28, and a front windshield 30. The vehicle 22 shown in FIGS. 1 and 2 is pickup truck and is just one example of a vehicle on which the vehicle shield 32 of the present invention may be mounted.

As shown in FIGS. 1 and 2, the vehicle shield 32 has a first lateral wing member 34 and a second lateral wing member 44 positioned on opposite sides of the front 24 of the vehicle 22. Preferably, the lateral wing members 34,44 are thin plate-like structures. Central wing section structure is provided to link the lateral wing members 34,44. The central wing section structure includes a central wing member 50 positioned between the lateral wing members 34,44. The first lateral wing member 34, the second lateral wing member 44, and the central wing member 50 cooperate to provide a continuous airflow engaging surface 54 extending across a portion of the front 24 of the vehicle 22.

As best illustrated in FIG. 1 and FIG. 2, the vehicle shield 32 is adapted to be movable between two positions, a first position and a second position. FIG. 1 illustrates the first position showing the vehicle shield 32 in an open position or deflecting position for deflecting airflow away from the windshield 30 during operation. By deflecting airflow away from the windshield 30, the vehicle shield 32 prevents road debris from contacting the windshield to prevent damage to or accumulation on the windshield.

FIG. 2 illustrates a second position of the vehicle shield 32 where the vehicle shield is in a closed or collapsed position. In the closed position, the vehicle shield 32 is in substantial conformity with the hood 26 of the vehicle 22. In this position, airflow deflection away from the windshield is minimal. The vehicle shield 32 is placed in the closed position to reduce its airflow deflecting properties without having to physically remove the vehicle shield 32 from the vehicle 22.

In addition to deflecting airflow from the windshield 30 of the vehicle 22, the vehicle shield 32 also functions as a hood protector during operation. In contrast to the on/off nature of the airflow deflecting feature, the vehicle shield 32 protects portions of the hood 26 from the contact with airflow whether the vehicle shield 32 is in the open or closed position, as is shown in FIGS. 1 and 2. In both the open position and in the closed position, the airflow engaging surface 54 functions to protect the hood 26 from damage by and accumulation of road debris.

Figures 6, 7:
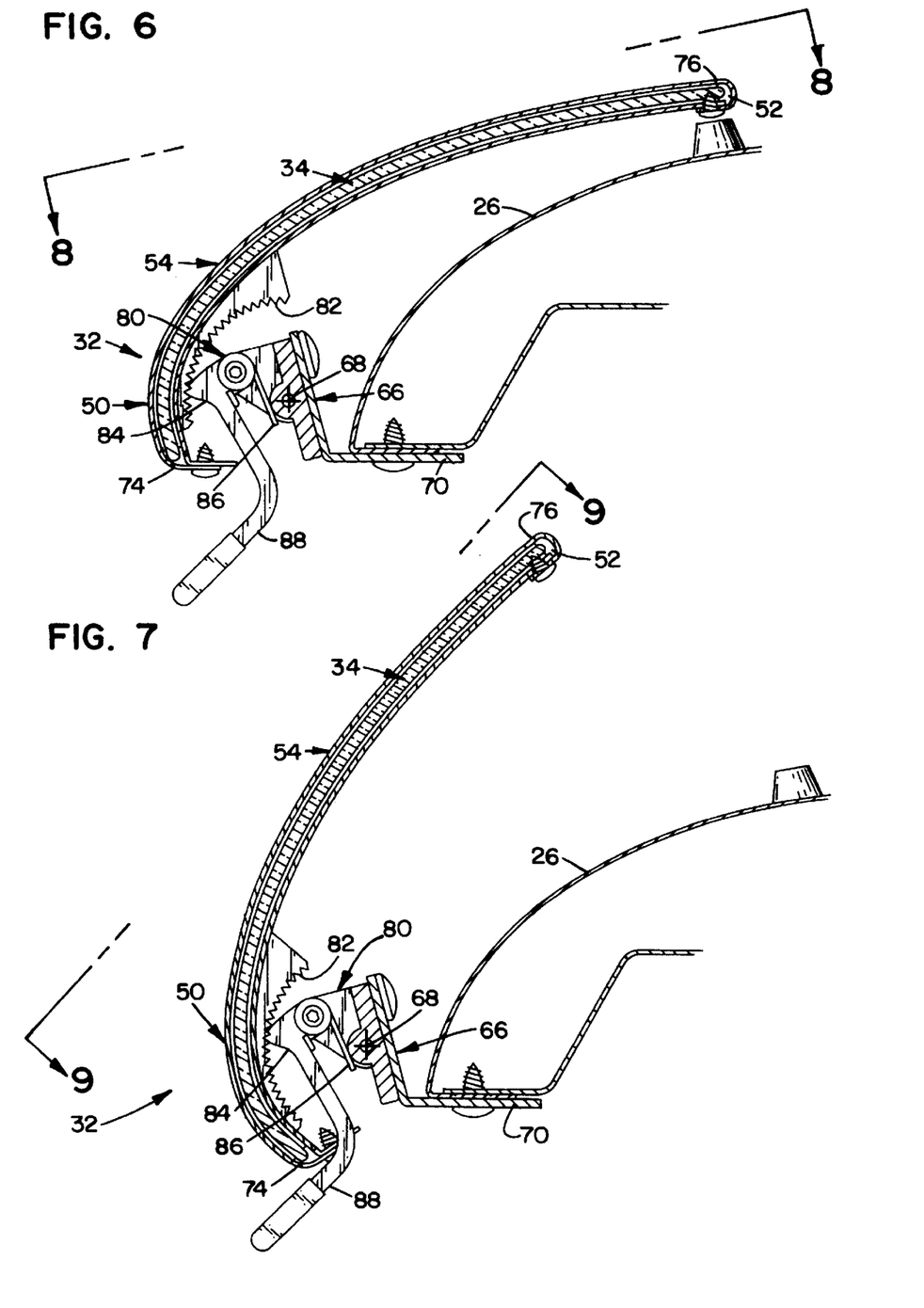
FIG. 6 is a cross-sectional side view of the vehicle shield device shown in FIG. 1 taken along lines 6—6 of FIG. 3 showing the device in the closed position.
FIG. 7 is a cross-sectional side view of the vehicle shield device shown in FIG. 1 taken along lines 6—6 of FIG. 3 showing the device in the open position.

Referring now to FIG. 6 and FIG. 7, the vehicle shield 32 is shown in cross-sectional side view in the closed position (FIG. 6) and in the open position (FIG. 7). The airflow engaging surface 54 of the cooperating lateral wing members 34,44 and central wing member 50 preferably has a generally smooth curvature from a front edge 74 of the vehicle shield to a back edge 76 of the vehicle shield. In the preferred embodiment shown, the airflow engaging surface 54 has a generally convex shape.

Figure 3:
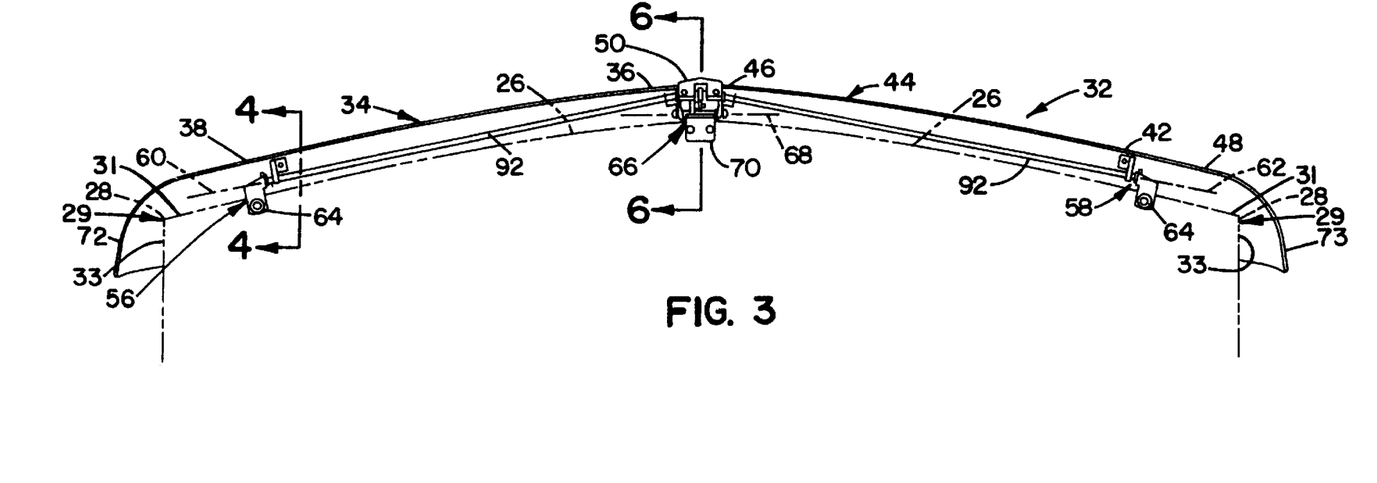
FIG. 3 is a bottom view of the vehicle shield device shown in FIG. 1 showing the device in the closed position.

The vehicle shield 32 is provided with structure for use in coupling the lateral wing members 34,44 to the hood 26. As best shown in FIG. 3, a first lateral hinge 56 and a second lateral hinge 58 couple the first lateral wing member 34 and the second lateral wing member 44 to the hood 26. Preferably, the first lateral hinge 56 and the second lateral hinge 58 are located at distal ends 38,48 of the lateral wing members 34,44. The first lateral hinge 56 defines a first hinge axis 60 and permits rotational movement of the first lateral wing member 34 about the first hinge axis while restraining longitudinal movement. The second lateral hinge 58 defines a second hinge axis 62 and permits rotational movement of the second lateral wing member 44 about the second hinge axis while restraining longitudinal movement.

Figure 4:
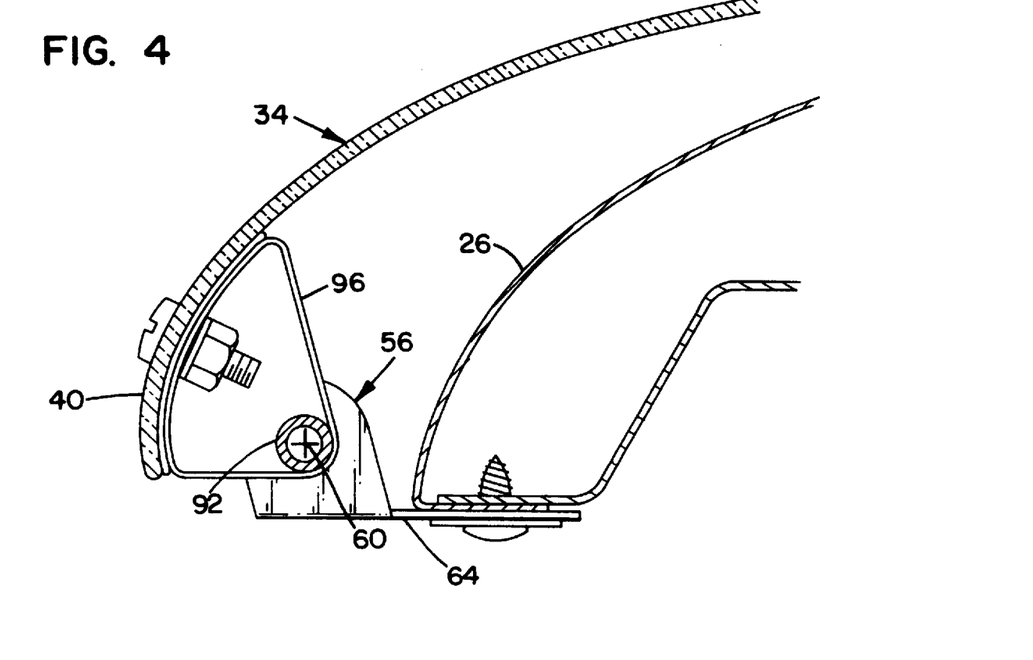
FIG. 4 is a cross-sectional side view of the vehicle shield device shown in FIG. 1 taken along lines 4—4 of FIG. 3 showing the device in the closed position.

The first lateral hinge 56 and the second lateral hinge 58 securely attach the distal ends 38,48 of the lateral wing members 34,44 to the hood 26 along a lower edge 40,42 of each lateral wing member. The first lateral hinge 56 and the second lateral hinge 58 each have a mounting tab 64 which extend underneath the hood 26. Referring now to FIG. 4, the first lateral hinge 56 is shown in an enlarged view illustrating the secure attachment of the lower edge 40 of the distal end 38 of the first lateral wing member 34 to the hood 26 to permit rotational movement about the first hinge axis 60. It is to be appreciated that various other mounting structures besides the hinges shown could be used for hingedly attaching the lateral wing members to the hood.

The central wing member 50, shown in FIGS. 1 and 2 as being positioned between the lateral wing members 34,44, has structure which retains and locates adjacent ends 36,46 of the lateral wing members 34,44. The central wing member 50 also permits relative movement of the adjacent ends 36,46 during rotation. As best shown in FIGS. 6 and 7, the central wing member 50 has a pocket 52 which surrounds at least a portion of the adjacent ends of each lateral wing member to retain and locate the adjacent ends. During rotation, the pocket 52 guides and aligns the adjacent ends of the lateral wing members.

Figure 5:
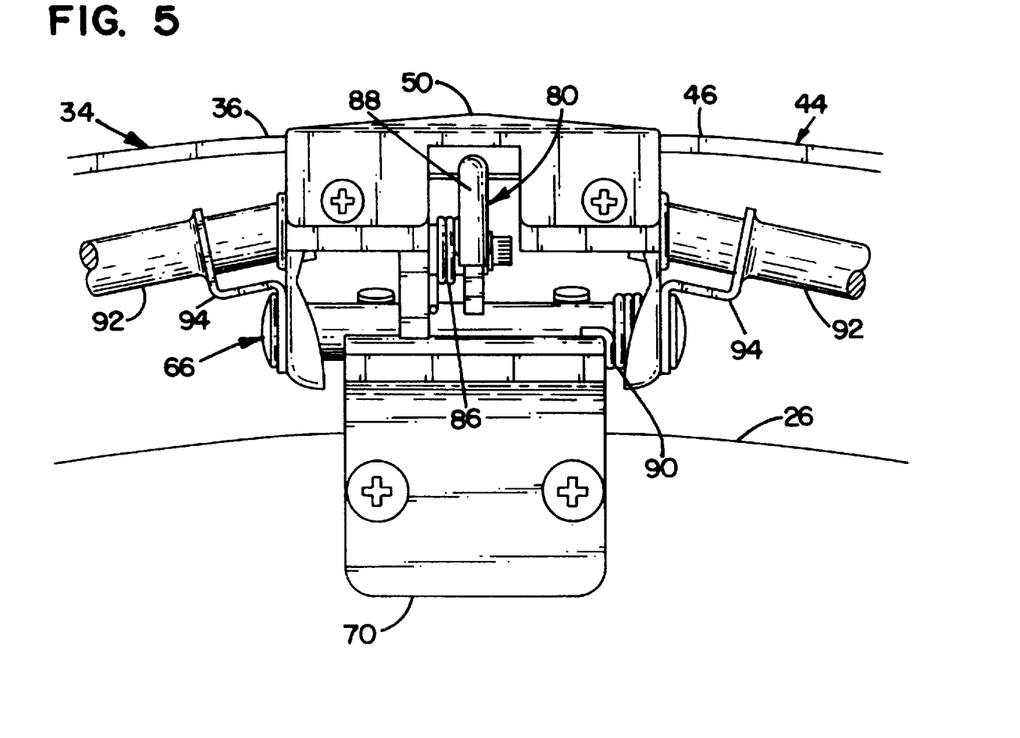
FIG. 5 is an enlarged bottom view of a central portion of the vehicle shield device shown in FIG. 1.

Central hinge structure is provided to attach the central wing member 50 to the hood 26. The central hinge structure includes a central hinge 66 for securely attaching the central wing member to the hood. Adjacent ends 36,46 of the lateral wing members 34,44 are attached to the hood 26 through the central wing member 50 and the central hinge 66. The central hinge 66 defines a central hinge axis 68 and permits rotational movement of the central wing member about the central hinge axis. As best shown in FIGS. 3 and 5, the central hinge 66 has a mounting plate 70 which extends underneath the hood 26 in a direction away from the front 24 of the vehicle 22. It is to be appreciated that various other structures could be used for hingedly attaching the central wing member to the hood besides the central hinge shown.

The first lateral hinge 56, the second lateral hinge 58, and the central hinge 66 cooperate to permit rotational movement of the vehicle shield 32 between the open position shown in FIG. 1 and the closed position shown in FIG. 2. The present invention permits rotational movement of the vehicle shield 32 such that the front edge 74 of the vehicle shield follows the contours of the front 24 of the vehicle 22 during rotation. As shown in FIG. 3, the contour of the front of the vehicle is such that the first hinge axis 60 and the second hinge axis 62 do not lie on the same straight line.

Figure 8:
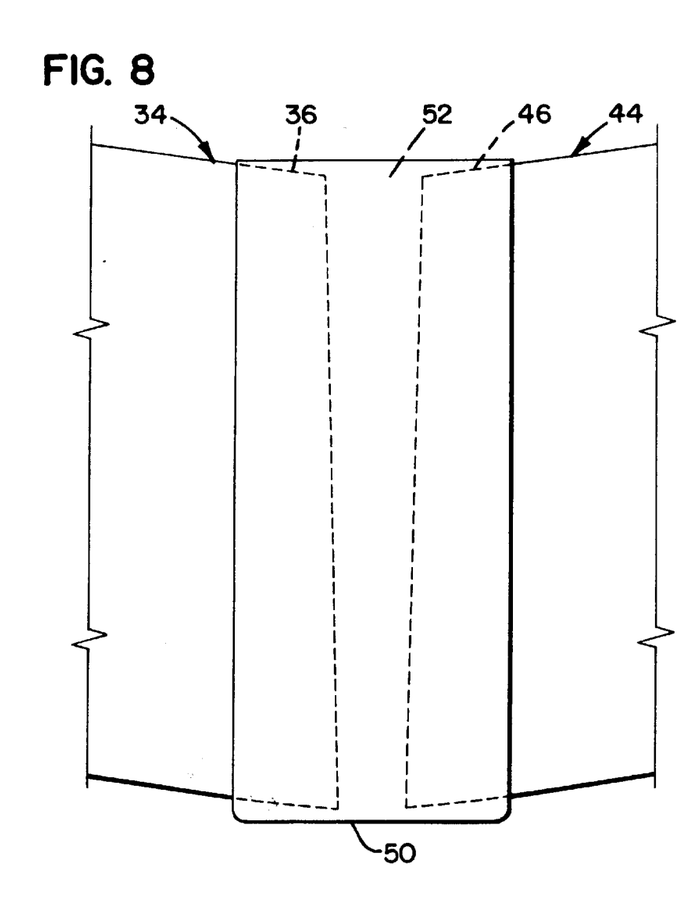
FIG. 8 is a partial diagrammatic top view of the device shown in FIG. 1 taken along lines 8—8 of FIG. 6 showing the device in the closed position.
Figure 9:
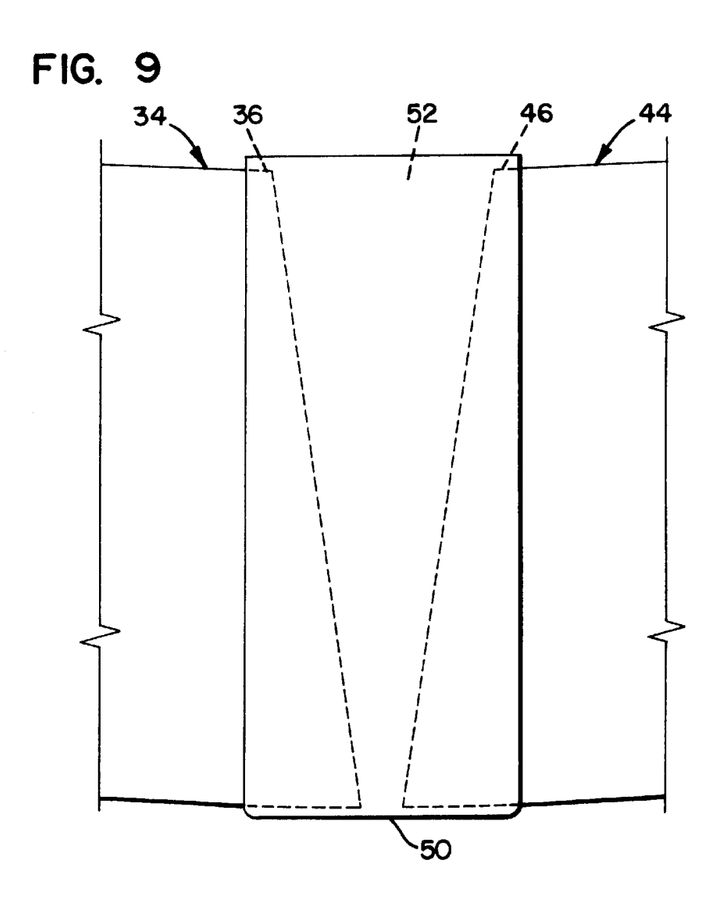
FIG. 9 is a partial diagrammatic top view of the vehicle shield device shown in FIG. 1 taken along line 9—9 of FIG. 7 showing the device in the open position.

Furthermore, the central hinge axis 68 lies on a different line from either the first hinge axis 60 or the second hinge axis 62. Since the first lateral hinge 56 and the second lateral hinge 58 are securely fastened to the respective lateral wing members 34,44 and the hinges permit rotational movement of the lateral wing members about each respective hinge axis while restraining longitudinal movement, the adjacent ends 36,46 of the lateral wing members will move relative to each other. The central wing member 50 permits relative movement while simultaneously cooperating with the lateral wing members to present the continuous airflow engaging surface 54 across the front 24 of the vehicle 22. FIGS. 8 and 9 best illustrate the relative movement between adjacent ends 36,46 of the lateral wing members 34,44 during rotation of the vehicle shield 32. FIG. 8 illustrates the position of the adjacent ends 36,46 when the vehicle shield 32 is in the closed position. FIG. 9 illustrates the position of the adjacent ends relative to each other when the vehicle shield is in the open position. During rotation, the adjacent ends 36,46 are maintained within the pocket 52 of the central wing member 50. The structure of the central wing member 50 permits the first lateral wing member 34, the central wing member 50, and the second lateral wing member 44 to rotate as a unit as the vehicle shield 32 is moved between the open and closed positions while presenting the continuous airflow engaging surface across a portion of the front 24 of the vehicle 22 in all positions of the vehicle shield.

The first preferred embodiment of the vehicle shield shown in FIGS. 1–9 preferably further includes two fender protector portions 72,73 each extending from each lateral wing member 34,44 such that a portion of the fender 28 on either side of the vehicle 22 is protected from contact with the airflow. FIGS. 1–3 best illustrate the fender protector portions 72,73. Preferably, the fender protector portions 72,73 are integrally formed with the lateral wing members 34,44. The fender protector portions 72, 73 cooperate with the lateral wing members 34,44 and the central wing member 50 to present the continuous airflow engaging surface 54 extending across a portion of the front 24 of the vehicle 22 which protects portions of the hood 26 and portions of the fenders 28 from contact with the airflow. In the preferred embodiment shown, each fender protector portion 72,73 is curved from the front 24 of the vehicle 22 in a direction toward the rear of the vehicle to present a more aerodynamic surface as shown in FIGS. 1–3.

In the first preferred embodiment, the vehicle shield 32 has structure for releasably locking or clamping the vehicle shield in the open position and in the closed position. More preferably, the vehicle shield 32 also has structure for variably positioning and locking the vehicle shield in positions between the open and closed positions. In the preferred embodiment, the structure for variably positioning and locking the vehicle shield into position is a ratchet arrangement 80 best illustrated in the cross-sectional views of FIG. 6 and FIG. 7. The ratchet arrangement 80 is mounted between the central wing member 50 and the central hinge 66.

The ratchet arrangement 80 generally includes a set of ratchet teeth 82 which are securely engaged by a pivotally mounted ratchet pawl 84. A ratchet spring 86 biases the ratchet pawl 84 into the locked position. To release the ratchet pawl 84 from the ratchet teeth 82 to permit rotational movement of the vehicle shield 32 to a new position, a ratchet lever 88 attached to the ratchet pawl 84 is pulled in a generally downward direction, away from the vehicle shield 32. When the ratchet pawl 84 is no longer engaging the ratchet teeth 82, the vehicle shield 32 is freely rotatable. Once the ratchet lever 88 is released after the vehicle shield is rotated, the ratchet spring 86 biases the ratchet lever 87 such that the ratchet pawl 84 engages the ratchet teeth 82 to lock the vehicle shield 32 into the new position. FIG. 7 illustrates the position of the ratchet pawl 84 relative to the ratchet teeth 82 when the vehicle shield 32 has been moved and locked into a new position from the position shown in FIG. 6. It is to be appreciated that various other structures could be used for variably positioning and locking the vehicle shield in various positions besides the rachet arrangement shown.

The ratchet arrangement 80 is preferably a one way ratchet such that to move the vehicle field 32 to a more open position does not require manual movement of the ratchet lever 88. Movement of the vehicle shield to a more open position can be effected by merely applying a transverse force to the vehicle shield. In that case, the ratchet arrangement 80 prevents the vehicle shield 32 from moving toward a more closed position during operation by acting to oppose the forces acting on the vehicle shield relative to the hinge axes caused by airflow engaging the vehicle shield. A second spring shown in FIG. 5, can be added to the central hinge 50 to bias the vehicle shield 32 in a downward direction against the ratchet pawl 84.

As noted above, the lateral wing members 34,44 are preferably elongate structures having thicknesses which are much smaller relative to the lengths and the widths. When the lateral wing members are exposed to airflow in a direction generally transverse to the airflow engaging surface 54, the lateral wing members may have a tendency to flex or twist. The twisting results from the distal ends 38,48 of the lateral wing members being hingedly attached to the hood 26 along the lower edges 40,42 of the lateral wing members. Unlike the central hinge wing member 50 which firmly locks the adjacent ends 36,46 of the lateral wing members into position through the ratchet apparatus 80, the lateral hinges 56,58 are not provided with locking structure and are freely rotatable in the preferred embodiment. The distal ends of the lateral wing members may have a tendency to twist or flex relative to the rest of the lateral wing members as a result of airflow engaging the vehicle shield during operation.

To address this problem, the first preferred embodiment of the vehicle shield 32 preferably further includes structure for supporting and stiffening each lateral wing member 34, 44 to reduce twisting movement of the distal ends 38,48 relative to the adjacent ends 36,46. The support structure includes two torsion bars 92, each rigidly mounted to the central wing member 50 and each rigidly mounted to the distal ends of one the lateral wing members. FIG. 5 illustrates the rigid connection of the torsion bars 92 to the central hinge 50 through arms 94. FIG. 4 illustrates the rigid connection of one of the torsion bars 92 to a plate 96 of the first lateral hinge 56. The torsion bars 92 help to stabilize the lateral wing members 34,44 by acting as springs to prevent the distal ends 38,48 of the lateral wing members from twisting during operation. By preventing twisting, the torsion bars 92 also assist in rotation of the vehicle shield 32 as a unit between positions and permit rotation of the vehicle shield 32 to occur by merely applying a force transverse to the central wing member. The torsion bars 92 further help to make the attachment of each lateral wing member to the central wing member more secure. It is anticipated that the torsion bars 92 could be used with a wide variety of adjustable vehicle shields in addition to the embodiment of the vehicle shield 10 shown in FIGS. 1–7.

In the first preferred embodiment, the first and second lateral wing members 34,44 are preferably made from a lightweight material, such as plastic, which is at least partially transparent. The lateral wing members are sufficiently transparent such that visibility is not excessively obstructed when the vehicle shield is in the open position. The transparent material is preferably also of the type that can be colored with various tints.

Figure 10:
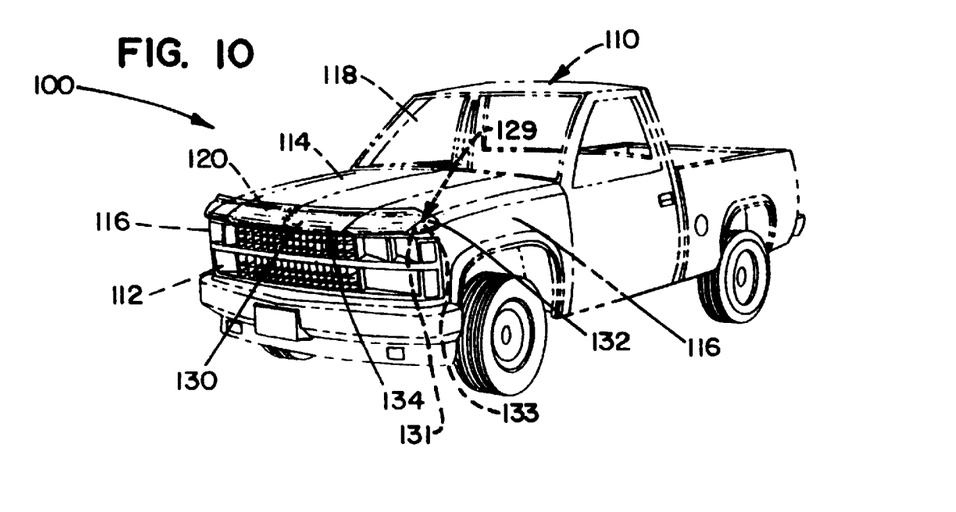
FIG. 10 is a perspective view of a second preferred embodiment of a vehicle shield device showing the device mounted to a vehicle.
Figure 11:
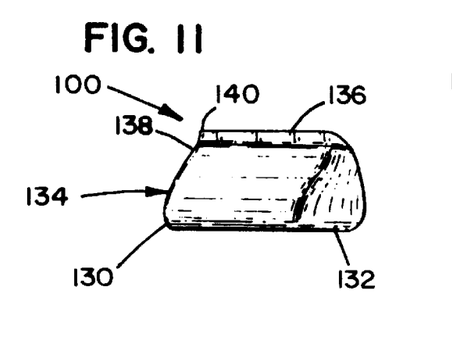
FIG. 11 is a side view of the vehicle shield device shown in FIG. 10.
Figure 12:
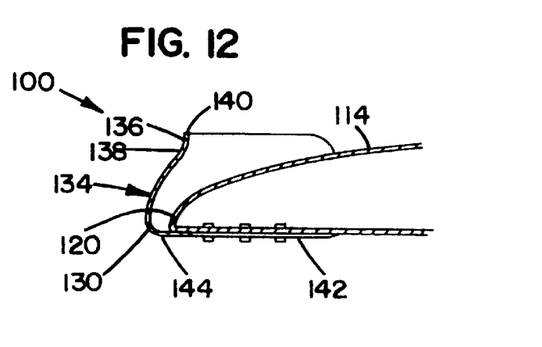
FIG. 12 is a cross-sectional side view of the vehicle shield device shown in FIG. 10 with a portion of the vehicle shown.

Referring now to FIGS. 10–14, a second preferred embodiment of a vehicle shield 100 is illustrated according to the principles of the present invention. As shown in FIG. 10, the vehicle shield 100 is mounted to a front 112 of a vehicle 110 having a hood 114, two front fenders 116, and a front windshield 118. The vehicle shield 100 includes a hood protector portion 130 extending across the front 112 of the vehicle 110 to protect a front surface 120 of the hood 114 from contact with airflow, as is best shown in FIG. 12. A fender protector portion 132 extends from each end of the hood protector portion 130 to protect a portion of the fenders 116 of the vehicle from contact with the airflow.

Figure 13:
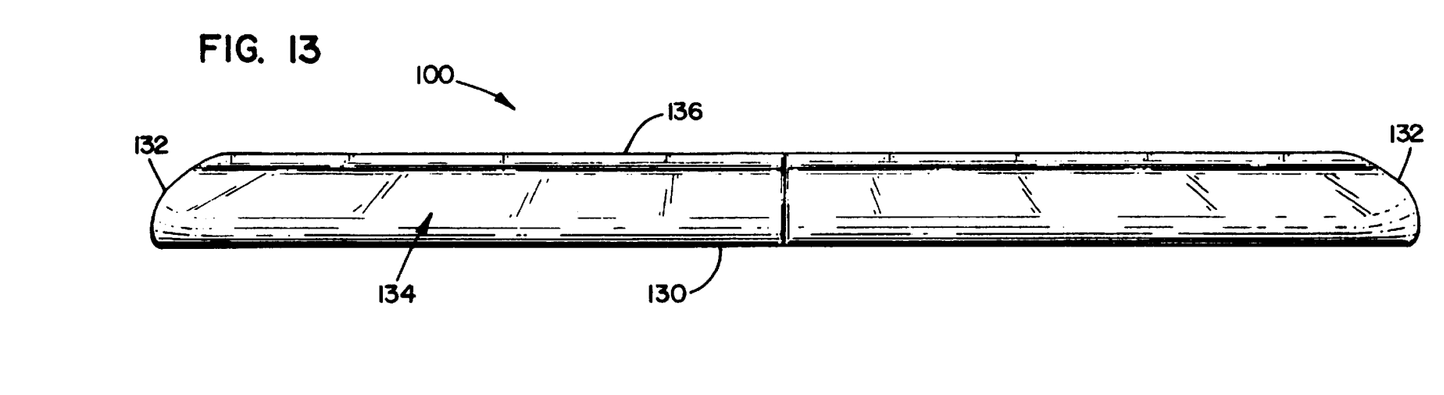
FIG. 13 is a front view of the vehicle shield device shown in FIG. 10.
Figure 14:
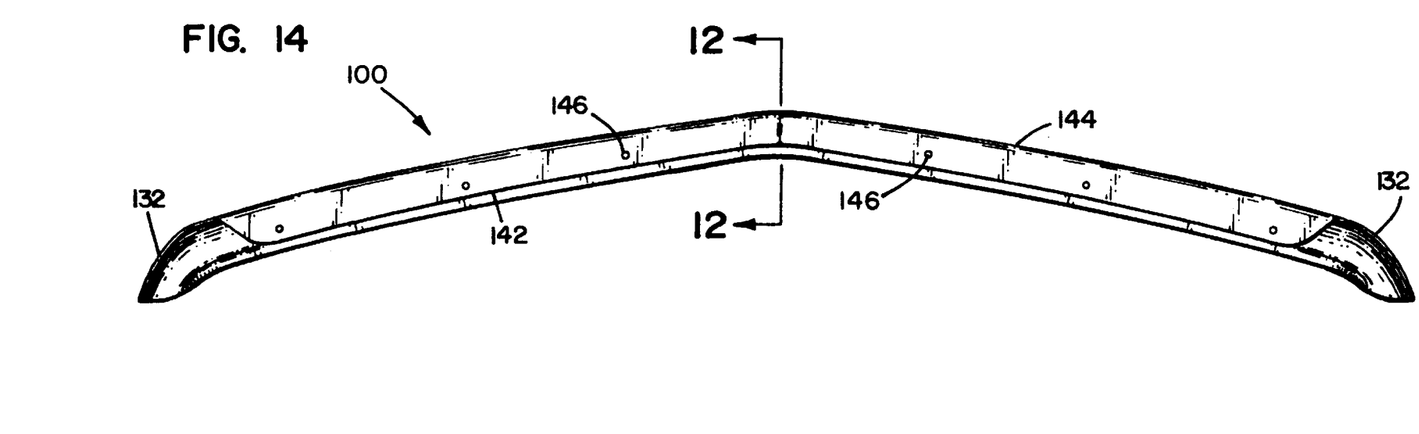
FIG. 14 is a bottom view of the vehicle shield device shown in FIG. 10.

The hood protector portion 130 and the fender protector portions 132 cooperate to present a continuous airflow engaging surface 134 as shown in FIG. 13. FIG. 10 illustrates the airflow engaging surface 134 extending across a portion of the front 112 of the vehicle 110 to protect the front surface 120 of the hood 114 and portions of the fenders 116 from contact with the airflow. Preferably, the fender protector portions 132 are curved toward the rear of the vehicle to present a more aerodynamic surface as is best shown in FIG. 14.

In the preferred embodiment shown, the vehicle shield 100 has an airflow deflector portion 136 extending from a back edge 138 of the hood protector portion 130. As shown in FIG. 12, the airflow deflector portion diverges away from the hood 114 and deflects airflow away from the windshield 118. The airflow deflector portion 136 extends away from the hood and terminates in an upwardly curving lip 140. The airflow deflector portion 136 cooperates with the hood protector portion 130 and the fender protector portions 132 to form the continuous airflow engaging surface 134 across the front 112 of the vehicle 110 as is best shown in FIG. 10.

Preferably, the vehicle shield 100 shown in FIGS. 10–14 has the hood protector portion 130, the fender protector portions 132 and the airflow deflector portion 136 which are formed as a continuous and integral unit. The vehicle shield 100 shown is preferably formed from a lightweight material, such as plastic, which is also preferably at least partially transparent. The material is also preferably of the type that can be colored with various tints such that the vehicle shield is tinted yet sufficiently transparent that visibility is not excessively obstructed.

The preferred vehicle shield 100 further includes structure for use in mounting the vehicle shield to the front 112 of the vehicle 100. As best shown in FIG. 14, the vehicle shield 100 includes a mounting member 142 extending from a front edge 144 of the hood protector portion 130 underneath the hood 114. Holes 146 are present in the mounting member 142 to permit attachment of the vehicle shield 100 to an underneath portion of the hood 114 by screws or other similar attachment devices (not shown). It is to be appreciated that various other mounting structures could be provided to mount the vehicle shield to the front of the vehicle.

Figure 15:
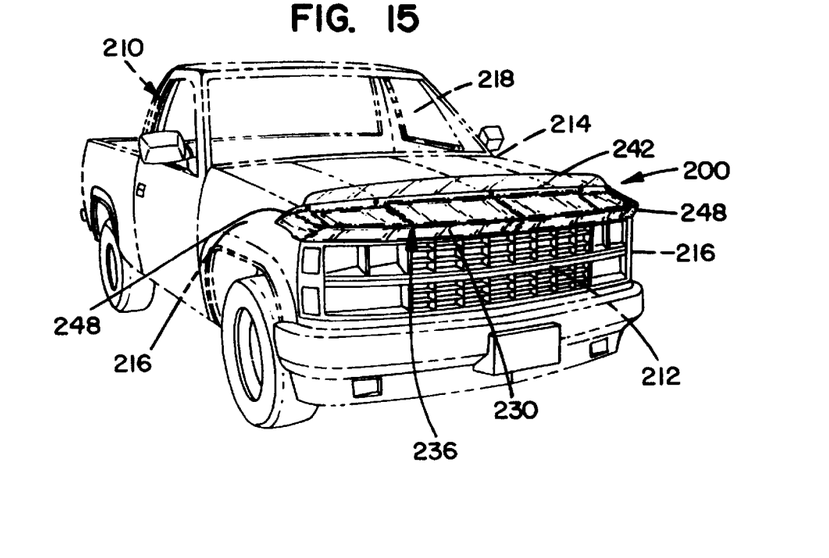
FIG. 15 is a perspective view of a third preferred embodiment of a vehicle shield device showing the device mounted to a vehicle.
Figure 16:
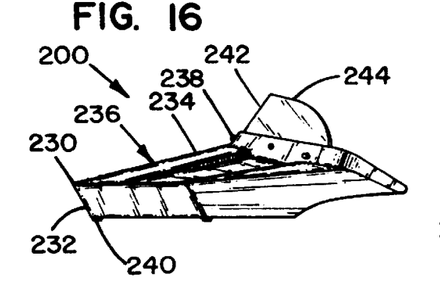
FIG. 16 is a side view of the vehicle shield device shown in FIG. 15.
Figure 17:
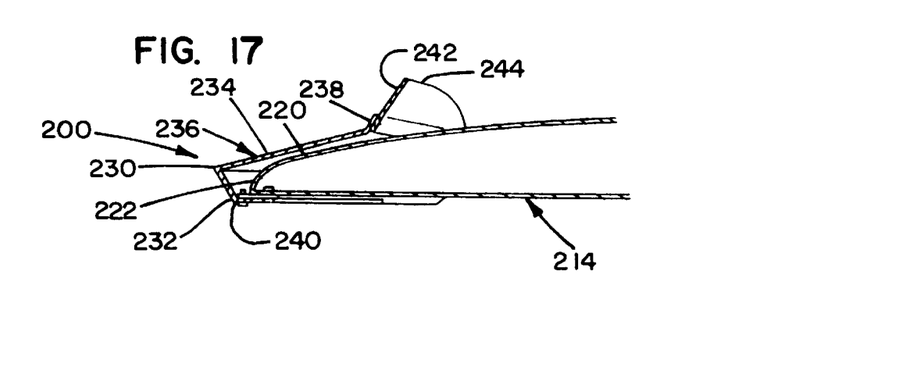
FIG. 17 is a cross-sectional side view of the vehicle shield device shown in FIG. 15 with a portion of the vehicle shown.
Figure 18:
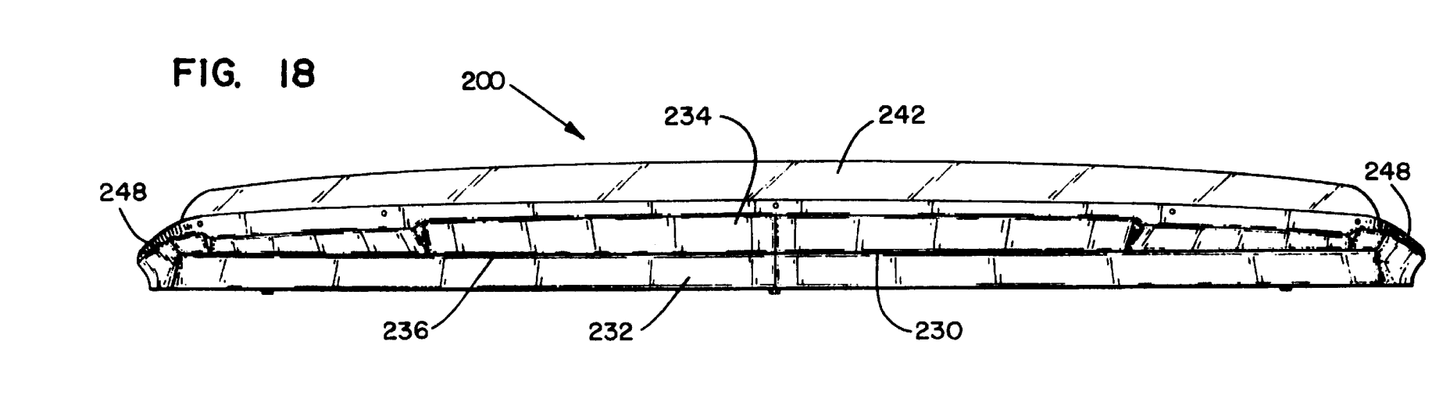
FIG. 18 is a front view of the vehicle shield device shown in FIG. 15.

Referring now to FIGS. 15–19, which illustrate a third preferred embodiment of a vehicle shield 200 according to the principles of the present invention, the vehicle shield is shown mounted to a front 212 of a vehicle 210. The vehicle has a hood 214, two fenders 216, and a windshield 218. The vehicle shield 200 includes a hood protector portion 230 extending across the front 212 of the vehicle 210. As is best shown in FIG. 17, the hood protector portion 230 includes a first protector portion 232 surrounding a front surface 222 of the hood 214. The hood protector portion 230 further includes a second protector portion 234 surrounding a portion of a top surface 220 of the hood 214 extending from the front surface 222 toward the windshield 218 in a general horizontal direction. The second protector portion 234 extends from the first protector portion 232 toward the windshield 218 in substantial conformity with the hood 214 and generally follows the contours of the hood as is best shown in the cross-sectional view of FIG. 17. The second protector portion 234 terminates in a back edge 238 which is removed from the front surface 222 of the hood. The first protector portion 232 and the second protector portion 234 cooperate to provide a continuous airflow engaging surface 236 across the front 212 of the vehicle 210 to protect the hood 214 from contact with the airflow as is best shown in FIGS. 15 and 18.

The vehicle shield 200 further has an airflow deflector portion 242 extending from the back edge 238 of the second protector portion 234. The airflow deflector portion 242 diverges away from the hood 214 as shown in FIG. 17 and deflects airflow away from the windshield 218 of the vehicle. As is best shown in FIG. 16, the airflow deflector portion 242 is moved substantially back from the front 212 of the vehicle and is positioned toward the windshield 218. The airflow deflector portion 242 and the hood protector portion 230 cooperate to form the continuous airflow engaging surface 236 extending from a front edge 240 of the hood protector portion to a back edge 244 of the airflow deflector portion. Because the airflow deflector portion 242 is positioned toward the windshield away from the front of the vehicle, the airflow deflector portion produces less drag than if the airflow deflector portion were located at the front of the vehicle. In addition, the airflow deflector portion is more efficient and has less distance to deflect than an airflow deflector portion located adjacent the front of the vehicle.

Figure 19:
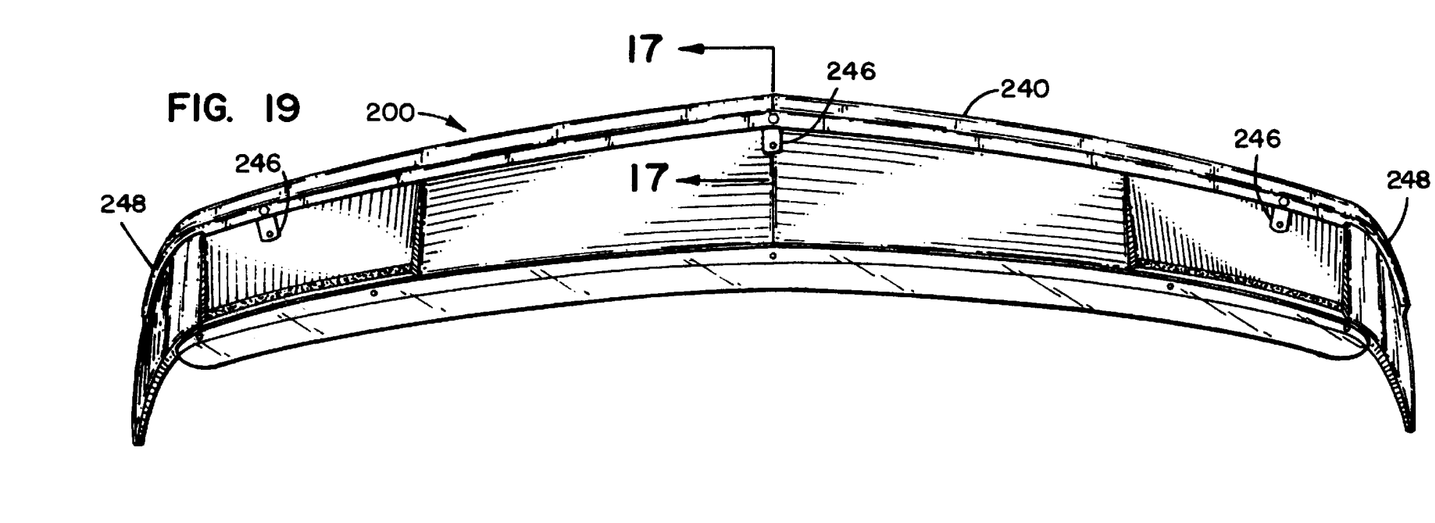
FIG. 19 is a bottom view of the vehicle shield device shown in FIG. 15.

As is best shown in FIG. 19, the preferred vehicle shield 200 has mounting tabs 246 on the front edge 240 of the hood protector portion 230. The mounting tabs 246 extend underneath the hood 214 to permit attachment of the vehicle shield 200 to the hood by mounting screws or similar devices (now shown). It is to be appreciated that various other mounting structures could be provided to mount the vehicle shield to the front of the vehicle.

Preferably, the vehicle shield 200 further includes a fender protector portion 248 on each end of the hood protector portion 230. The fender protector portions 248 protect portions of the front fenders 216 from contact with the airflow. The fender protector portions 248 cooperate with the airflow deflector portion 242 and the hood protector portion 230 to form the continuous airflow engaging surface 236 spanning the front of the vehicle as is best shown in FIG. 15. In the preferred embodiment shown, the fender protector portions 248 are curved toward the rear of the vehicle to present a more aerodynamic surface.

The vehicle shield 200 is preferably made of lightweight material. In the embodiment shown in FIGS. 15–19, the vehicle shield is constructed as two pieces wherein the hood protector portion 230 and the fender protector portions 248 are made from a fiberglass material and the airflow deflector portion 242 is made from a lightweight, transparent plastic material. More preferably, the airflow deflector portion 242 is made from a plastic material that is tintable such that the airflow deflector portion is colored yet visibility is not excessively restricted.

Figure 20:
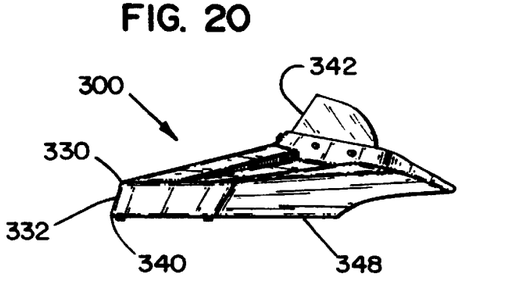
FIG. 20 is a side view of a fourth preferred embodiment of a vehicle shield device.

FIG. 20 illustrates a fourth preferred embodiment of a vehicle shield 300. The fourth preferred embodiment of the vehicle shield is similar to the third preferred embodiment in that it has a hood protector portion 330 at a front of a vehicle (not shown) and an airflow deflector portion 342 moved back toward a windshield (not shown). The vehicle shield is different in that it has a differently configured first protector portion 332 of the hood protector portion 330. As shown in FIG. 20, the first protector portion 332 angles from a front edge 340 toward the rear of the vehicle instead of angling from the front edge in a direction toward the front of the vehicle.

It is to be understood, that even though numerous characteristics and advantages of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are meaning of the terms in which the appended claims are expressed.

What is claimed is:

1. An airflow protector device mountable to a front of a vehicle having a hood and a fender, the airflow protector device comprising:

a hood protector portion, said hood protector portion having a first protector portion adapted to surround a generally vertical front surface of said hood, said hood protector portion further having a second protector portion adapted to surround a generally horizontal top surface of said hood said first protector portion and said second protector portion presenting a continuous airflow engaging surface to protect said front surface and said top surface of said hood from contact with airflow;

a fender protector portion;

the hood protector portion and the fender protector portion cooperating to present a continuous airflow engaging surface extending across a portion of said front of said vehicle for protecting a portion of said hood and a portion of said fender of said vehicle from contact with airflow; and an airflow deflector portion extending from a back edge of said second protector portion and diverging away from said surface of said hood;

wherein said airflow deflector portion is made from transparent plastic and said hood protector portion and said fender protection portion are made from fiberglass.

2. The airflow deflector device of claim 1, further comprising means for mounting said airflow protector device to said front of said vehicle.

* * * * *

UNITED STATES PATENT AND TRADEMARK OFFICE
CERTIFICATE OF CORRECTION

PATENT NO. : 6,027,156
DATED : FEBRUARY 22, 2000
INVENTOR(S) : LUND ET AL.

It is certified that error appears in the above-identified patent and that said Letters Patent is hereby corrected as shown below:

Front page, [56] References Cited, Other Publications: "Bug Gard" should read --BUG GARD-- (two occurrences)

Col. 1, line 10: "divisional" should read --Divisional--

Col. 3, line 22: "drawings wherein" should read --drawings, wherein--

Col. 9, line 43: "now" should read --not--

Signed and Sealed this

Seventeenth Day of April, 2001

Attest:

NICHOLAS P. GODICI

*Attesting Officer*    *Acting Director of the United States Patent and Trademark Office*